Dec. 23, 1969  L. E. MILLER ET AL  3,485,339
ARTICLE SPACING SYSTEM
Filed Dec. 11, 1967  4 Sheets-Sheet 1
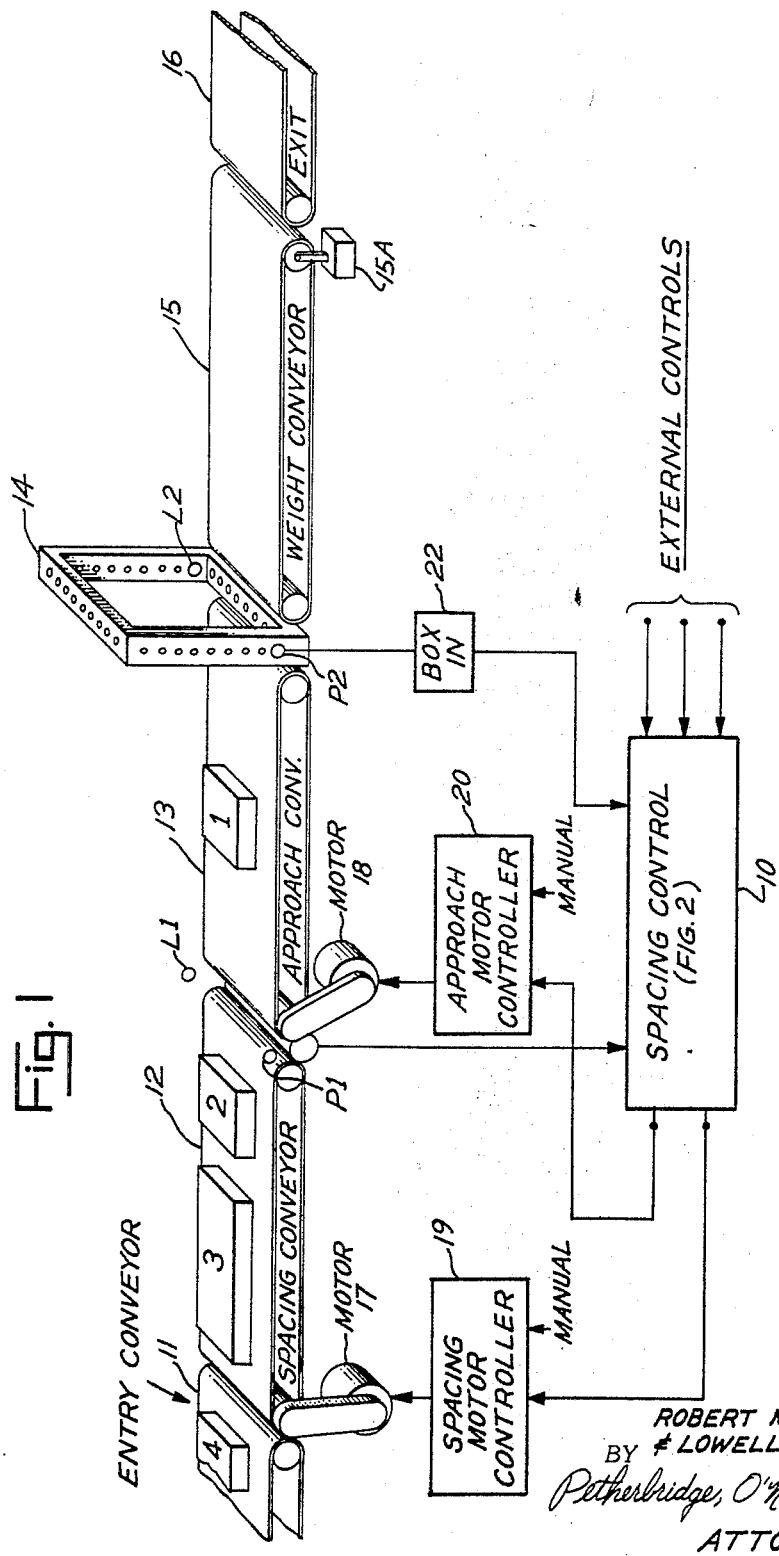
INVENTORS
ROBERT M. HENDERSON
& LOWELL E. MILLER
BY
Petherbridge, O'Neill & Aubel
ATTORNEYS

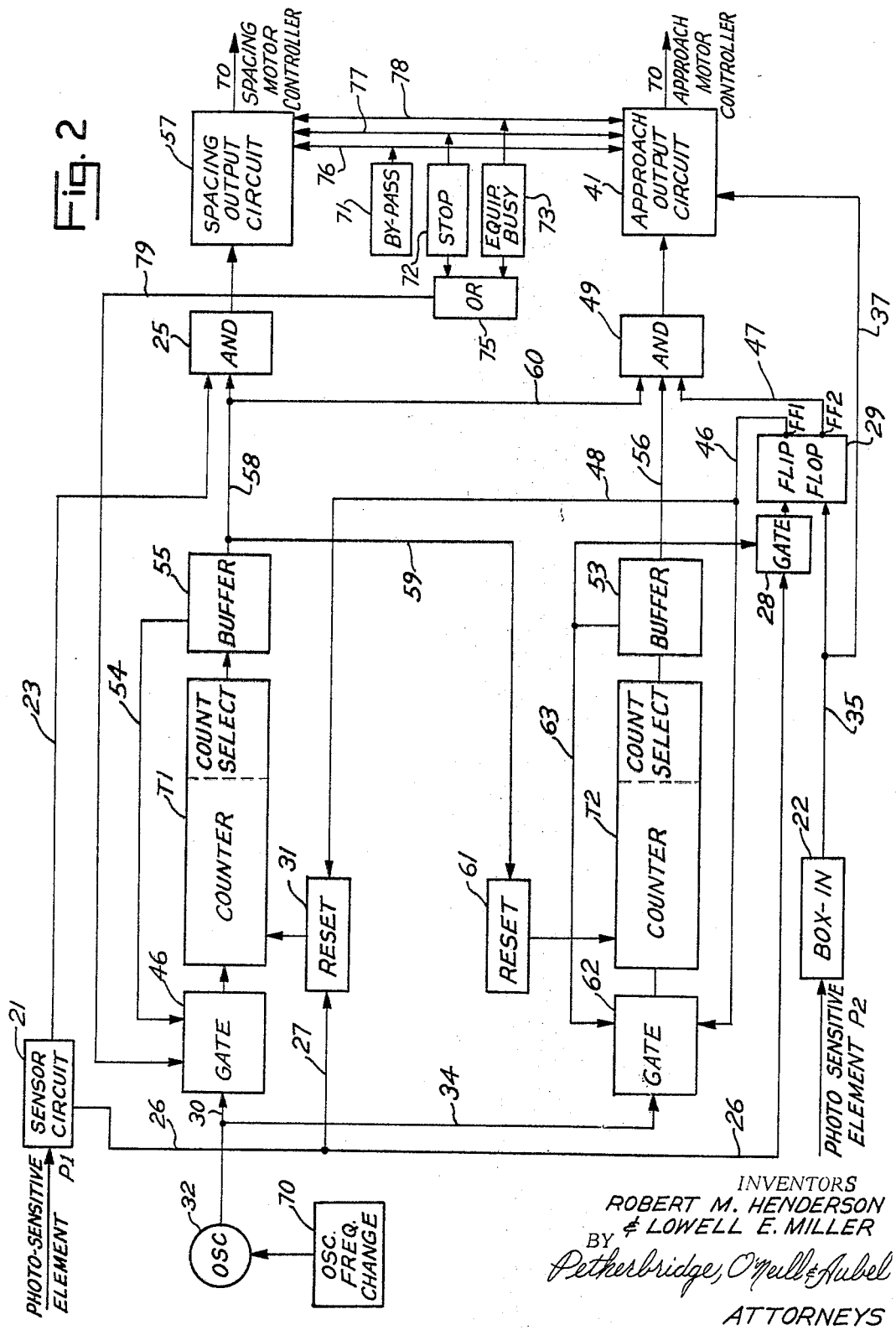

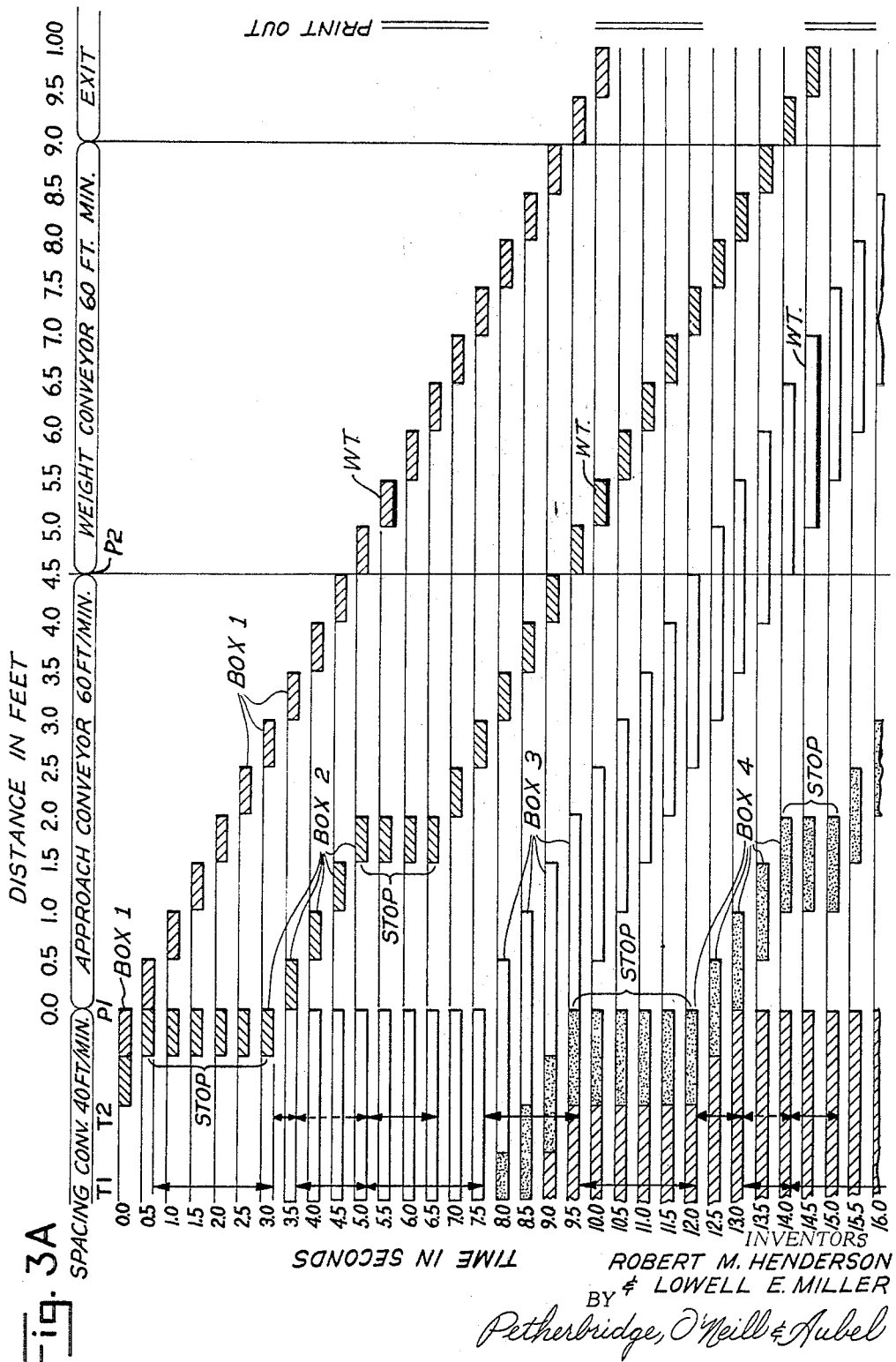

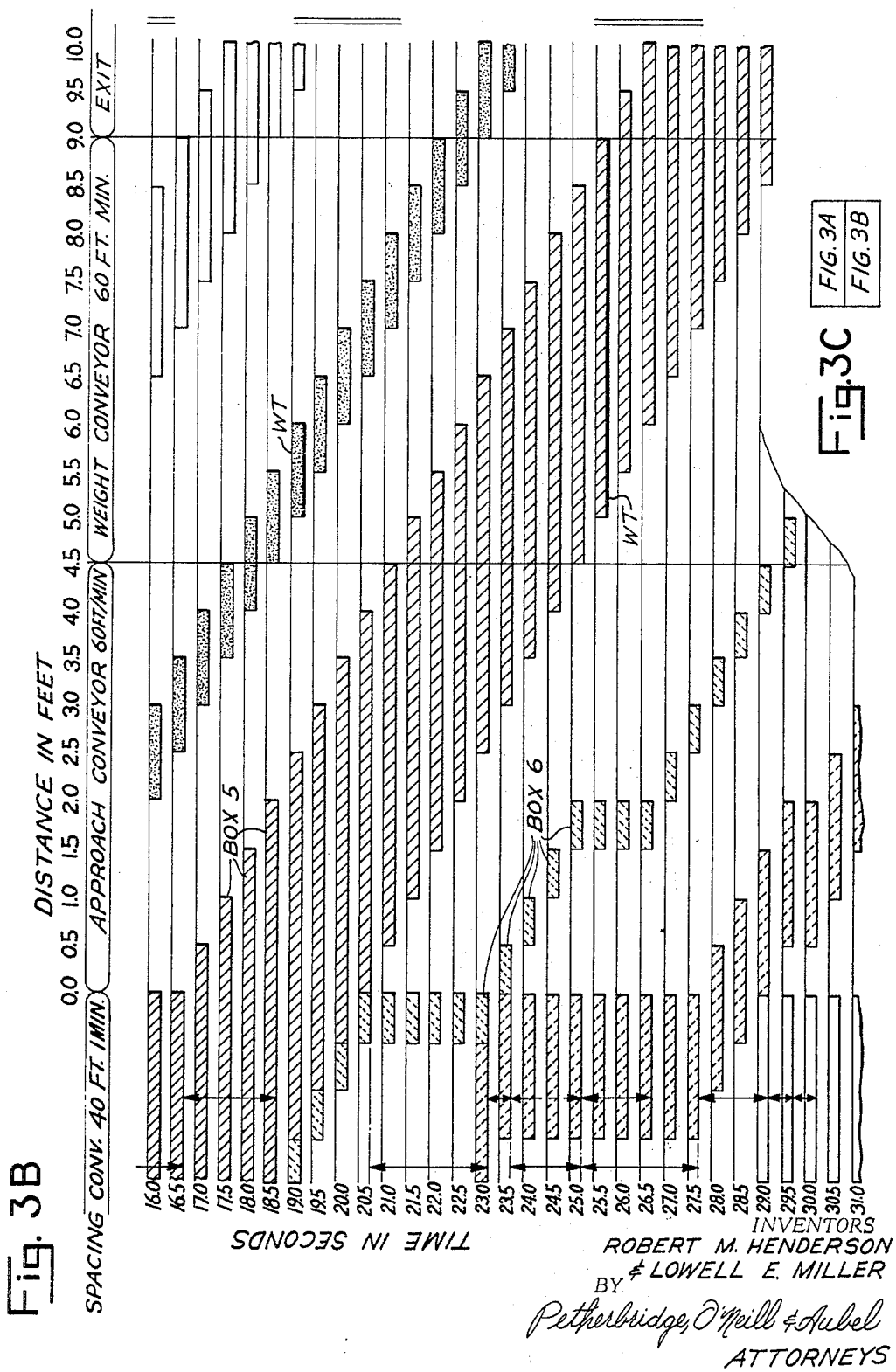

United States Patent Office 3,485,339
Patented Dec. 23, 1969

3,485,339
ARTICLE SPACING SYSTEM
Lowell E. Miller, Beloit, and Robert M. Henderson, Williams Bay, Wis., assignors to Fairbank Morse Inc., New York, N.Y., a corporation of Delaware
Filed Dec. 11, 1967, Ser. No. 689,395
Int. Cl. B65g 47/30
U.S. Cl. 198—34                                                14 Claims

ABSTRACT OF THE DISCLOSURE

An apparatus and system is disclosed for spacing articles, of different lengths being advanced along a path, to have a selected spacing therebetween to permit processing of each article such as for purposes of weighing, measuring, or labeling.

CROSS-REFERENCES TO RELATED APPLICATIONS

Ser. No. 689,077, filed on Dec. 8, 1967, entitled Motor Controlled Circuit and assigned to the same assignee as the present invention.

BACKGROUND OF THE INVENTION

Field of the invention

The latest patents known to applicant of the type relating to this invention have been classified under Patent Office classifications classes 198—76; 198—232; 177—3; 209—71 and 317—142.

Description of the prior art

The prior art patents known to applicant are: 2,941,126, Frankenfield; 3,075,630, Fisk; 3,196,964, Allen; 3,200,932, Metz et al.; and 3,311,224, King.

In article spacing systems for articles moving on a conveyor heretofore known in the prior art, apparatus is provided for spacing articles of selected lengths a given distance apart. None of the prior art appears to show apparatus for spacing articles, having different lengths and moving on a conveyor, a selected distance apart dependent upon the length of the individual articles.

SUMMARY OF THE INVENTION

This invention relates to a system and apparatus for enabling articles, such as boxes, packages and/or bags, which are moving along a conveyor to be spaced a selected distance apart, dependent upon the length of the boxes. It is necessary to provide this spacing in order to provide sufficient time; i.e., spacing between the boxes to permit adequate processing of each box such as for purposes of measuring, weighing, or labeling.

In one embodiment, the boxes of varying lengths moving along a conveyor pass from a spacing conveyor to an approach conveyor and pass a measuring means to a weighing conveyor where the boxes are weighed. The weighing conveyor is of a selected length and provision must be made to assure that only one box is on the weighing conveyor at a given time so that the proper weight of that box can be obtained.

BRIEF DESCRIPTION OF THE DRAWINGS

FIG. 1 is a block diagram indicating various elements and a conveyor system in accordance with the invention.

FIG. 2 is a block diagram of a control circuitry in accordance with the invention.

FIGS. 3A and 3B are timing graphs useful in explaining the operation of the invention; and FIG. 3C shows the respective orientation of FIGS. 3A and 3B.

DESCRIPTION OF THE PREFERRED EMBODIMENTS

The system of FIG. 1 includes an advancing means depicted as conveyors for advancing or moving articles or objects of any shape or form, such as boxes along a given path. An Entry Conveyor 11 carries or feeds the articles (four of which articles are shown as boxes labeled 1, 2, 3 and 4 in FIG. 1) onto a Spacing Conveyor 12. The boxes move from the Spacing Conveyor 12 to Approach Conveyor 13, past a photosensitive measuring system 14 described and claimed in patent application Ser. No. 571,112, entitled "Measuring System" and filed on Aug. 8, 1966, in behalf of Henderson et al. and assigned to the same assignee as the present invention. The boxes then move on to a Weight or Weighing Conveyor 15 by means of which the weight of the boxes is obtained, and thence the boxes move on to an Exit Conveyor 16 for loading or storage The Spacing Conveyor 12 is driven by an associated Motor 17 at a rate of forty feet per minute. The Approach Conveyor 13 is driven by an associated Motor 18 at the rate of sixty feet per minute. The Weight Conveyor 15 is driven by one or more separate motors such as 15A at a rate of sixty feet per minute. The Entry and Exit Conveyors may be driven by other motors, not shown. The Weight or Weighing Conveyor 15 is designed to be four and one-half feet long since it has been found that this size conveyor is commercially practical to accommodate a maximum number of the size of boxes being handled.

A principal requirement of the system of FIG. 1 is that there be only one box on the Weight Conveyor 15 while the weighing operation is being performed. Accordingly, boxes preceding and succeeding the box being weighed must be off the Weight Conveyor during the weighing operation for a given box.

The Spacing Conveyor 12 and the Approach Conveyor 13 have been designed in relation to the Weight Conveyor and the rate of movement of the Weight Conveyor 15 to provide a minimum spacing between succeeding boxes of different lengths and still permit the weighing function to be performed. Accordingly, in the embodiment shown, the Spacing Conveyor 12 and the Approach Conveyor 13 are each four and one-half feet in length. As mentioned above, the Spacing Conveyor 12 moves at the rate of forty feet per minute and the Approach Conveyor moves at the rate of sixty feet per minute. It will, of course, be understood that the invention is not limited to the length of the conveyors shown nor to the rate of travel indicated. For example, the Spacing Conveyor 12 could also be arranged to move at the rate of sixty feet per second, and means could be provided to maintain boxes a minimum of say, one-inch apart to provide a control response from the associated photosensitive element as will become apparent.

The motors 17 and 18, and the respective associated static Motor Controllers 19 and 20 are units utilized to selectively start and stop the Spacing an dApproach Conveyors to obtain the proper spacing between the boxes, as will be explained. More specifically, the Motors 17 and 18 are controllably energized and deenergized through the respective Static Motor Controllers 19 and 20 which are the subject of the above patent application Ser. No. 689,077.

The Spacing Control 10 which provides the signals to drive the Motors 17 and 18 through the respective Static Motor controllers 19 and 20 responds to, or is controlled in part by, a Lamp or Light L1 cooperating with a photosensitive element or Photoconductor P1 and an associated electronic Sensor Circuit 21 (see also FIG. 2). The Lamp L1 and the photosensitive element P1 are positioned along an arbitrary datum line extending between the Spacing Conveyor and the Approach Conveyor to sense the presence and/or absence of a box at that point. The Lamp L1 and the photoconductor P1 straddle the conveyors and hence a box passing therebetween interrupts the light from Lamp L1 to photoconductor P1. The Spacing Control 10 also responds to a photosensitive element P2 cooperating with a Lamp L2 and an associated electronic Box-In circuit 22 as will be explained. Lamp L2 and photosensitive element P2 are located along an arbitrary datum line extending between the Approach Conveyor 13 and the Weight Conveyor 15.

The other control signals are provided to the Spacing Control 10 from external sources as will be explained in connection with the following description of FIG. 2.

Note, at the outset, that all of the electronic circuitry indicated by the blocks of FIG. 2 represent well-known and readily available circuitry, and hence the electronic circuits or units per se will not be described other than in their overall relation to the system.

The Sensor Circuit 21 which is responsive to the Photoconductor P1 provides a signal to the remaining portion of the circuit of FIG. 2 indicating the instantaneous presence or absence of a box at that point. Sensor Circuit 21 may be arranged, as is well-known in the art, to provide a relatively high potential output signal when Photoconductor P1 is dark; i.e., the light rays from the associated Lamp L1 are being interrupted, as by a box; and, to provide a relatively low potential output signal when Photoconductor P1 is light; i.e., being energized by the light rays of Lamp L1.

Sensor Circuit 21 is connected through a conductor or lead 23 to a two-input And circuit 25; through a lead 26 and a Gate 28 to a bistable multivibrator or Flip-Flop circuit 29; and, through leads 26, 27 and a Reset circuit 31 to a Counter T1. And circuit 25 is arranged to be "ON"; i.e., pass a signal to a Spacing Output Circuit 57, when the signals on both its input leads 23 and 58 are high.

The Box-In circuit 22 is responsive to the Photoconductor P2 which is sensitive to the associated Lamp L2, similarly as Photoconductor P1 and Lamp L1. As mentioned, Photoconductor P2 and Lamp L2 are positioned along a datum line extending between the Approach Conveyor 13 and the Weight Conveyor 15. The Box-In circuit 22 provides a signal to the Spacing Control circuitry 10 indicating the instantaneous presence of a box at that point in a manner similarly as Photoconductor P1. More specifically, Box-In circuit 22 provides an output through lead 35 to Flip-Flop (bistable) circuit 29, and through leads 35 and 37 to an Approach Output Circuit 41.

Flip-Flop circuit 29 has one of its output terminals FF1 connected through leads 46 and 48 to Reset circuit 31; also terminal FF1 is connected through lead 46 to a Gate 62 for a Counter T2 for purposes to be explained. Further, Flip-Flop 29 has its other output terminal FF2 connected through a lead 47 to a three-input And Circuit 49. When the signals on the three input leads to And circuit 49 are high, And circuit 49 will be "ON" and a signal will be coupled through Approach Output Circuit 41 to cause Static Motor Controller 20 to deenergize Motor 18 and stop Approach Conveyor 13, see also FIG. 1. The details of the foregoing operation will be explained hereinbelow.

An oscillator 32 provides a train of timing pulses through Gate circuit 46 to activate the Counters T1 and T2 through leads 30 and 34 respectively. The Counter T1 is connected through an associated Buffer 55 and to And circuit 25. Buffer 55 provides a feedback signal through lead 54 to Gate 46, for purposes to be explained. The output of the And circuit 25 is coupled through a Spacing Output circuit 57 to the Static Motor Controller 19 to start and stop the Motor 17. Buffer 55 is also connected through lead 59, to Reset circuit 61 to the second Counter T2, and through lead 60 to And circuit 49.

Counter T2 is gated "ON" by a Gate 62 and its output is connected through Buffer 53 and And circuit 49 to the Approach Output Circuit 41. Buffer 53 is also connected through lead 63 back to Gate 62 and also to the Gate 28 for Flip-Flop 29, for purposes to be explained.

Counters T1 and T2 may be similar counters, and, in one embodiment, each comprises two Fairchild 9958 type counter elements. Likewise, Gates 46 and 62 are similar and each comprises a Fairchild 923 Flip-Flop circuit. As is known, the counters may be set to count to a selected number of counts during a given period of time in response to the input pulses from the Oscillator 32. In one embodiment, the Counter T1 is set to count to 50 during a period of two and one-half seconds and Counter T2 is set to count to 40 in two seconds; that is, Counters T1 and T2 count at the rate of 20 counts per second. The number to which the Counters T1 and T2 are set to count and the rate of count which is obtained is related to the various system requirements, and may be set as desired. Note that to change the rate of count, the rate of the pulses from Oscillator 32; that is, the frequency of the oscillator output, may be changed by any suitable known means 70 such as by switching to change the RC time constant of the oscillator 32.

Note, of course, that timing means, other than Counters T1 and T2, such as RC timers could likewise be employed. Also pulser means driven, for example, by the conveyors themselves could be substituted for the oscillator 32.

A By-pass circuit 71 when manually energized provides a signal through lead 76 to cause the Spacing and Approach output circuits 57 and 41 to "override" any signal inputs from the circuits of FIG. 2, and any signals received through Photoconductors P1 and P2 are ineffective to stop movement of the Spacing or Approach Conveyors.

The Stop circuit 72 when manually energized provides a signal through lead 77 to cause the Spacing and Approach circuits 57 and 41 to stop regardless of the signal input to the circuits from Photoconductors P1 and P2.

A signal on Equipment Busy circuit 73 is received from the external equipment (such as the associated computers) when the equipment is busy and cannot process boxes being handled on the conveyor. An equipment Busy circuit 73 will then provide a signal through lead 78 to cause the Spacing Conveyor and Approach Conveyor to stop. The Stop circuit and the Equipment Busy circuit 73 are also connected through an Or circuit 75 and lead 79 to the gate 46 to block or hold gate 46 such that no counts are entered into the Counter T1 when the Stop circuit 72 or the Equipment Busy circuit 73 receives a signal. As soon as the Stop or Equipment Busy signal terminates, Counter T1 resumes counting and the system and circuit resumes normal operation.

The operation of the circuits of FIGS. 1 and 2 will now be described with reference to FIGS. 3A and 3B. In FIGS. 3A and 3B the axis of abscissas represents distance in feet and the axis of ordinates represents time in seconds. The length of each of the boxes as well as the relative position of the various boxes from the time the boxes move from the Spacing Conveyor onto the Approach Conveyor the Weight Conveyor and onto the Exit Conveyor is clearly indicated in FIGS. 3A and 3B. For example, boxes 1 and 2 are each one-half foot in length, box 3 is two feet in length and box 4 is one foot in length. Also, for example, the Approach Conveyor moves the boxes a distance of four feet in four seconds. Note also that FIGS. 3A and 3B indicate when the Spacing Conveyor and the Approach Conveyor are stopped and a box is stationary, see, for example, the position of box 1 and box 2 labeled stop.

Also, in FIGS. 3A and 3B the time period during which Counters T1 and T2 are counting is indicated by the solid double-ended arrows along the axis of the ordinate. The time period during which Counter T2 is in a count "hold" condition, as will be explained, is indicated by the dotted double-ended arrows.

Assume the Circuit of FIG. 2 is in operation; Motor 17 is running and moving Spacing Conveyor 12; Motor 18 is running and moving the Approach Conveyor 13; a group of boxes is being advanced by the conveyors 11, 12, 13, 15, 16; and, Oscillator 32 is providing pulses to the circuit. When box 1 interrupts the light to Photoconductor P1, P1 will go from a light to a dark condition and Sensor Circuit 21 will provide a high voltage signal to And circuit 25. As mentioned, And circuit 25 will be "ON" to provide a signal through Spacing Output Circuit 57 and Spacing Motor Controller 19 to stop Motor 17 when the signals inputs on both leads 23 and 58 are high. However, at this particular instant, And circuit 25 will be receiving a low signal from Counter T1 through Buffer 55, hence And circuit 25 will remain "OFF." Accordingly, Motor 17 will continue to drive Spacing Conveyor 12.

Note that the term "high" and "low" signals as used herein refer to relative levels of signal voltages.

When box 1 passes the P1 datum line (at the 0.5 second mark in FIG. 3A), the output signal from Sensor Circuit 21 will change from high to low, causing Reset Circuit 31 to reset Counter T1 to zero. The pulses from Oscillator 32 coupled through Gate 46 will cause Counter T1 to start to count toward the number 50. When Counter T1 is counting, a high signal will be couped from Counter T1 through Buffer 55 and lead 58 to And circuit 25. However, at this point Sensor circuit 21 will be coupling as low signal to And circuit 25, and And circuit 25 will remain OFF.

As mentioned above, in the embodiment shown the Approach Conveyor 13 moves at 60 feet per minute while Spacing Conveyor 12 moves at 40 feet per minute; accordingly, as box 1 is advanced from the Spacing Conveyor to the Approach Conveyor it will space itself a slight distance from box 2. Thus, Photoconductor P1 will momentarily become light. Next as box 2 moves into position to interrupt the light rays to Photoconductor P1, P1 will go from a light to a dark condition, Sensor Circuit 21 will now couple a high signal through lead 23 to And circuit 25. Since Counter T1 is in a counting condition, a high signal will also be coupled through lead 58 to And circuit 25. Thus, And circuit 25 will be "ON," causing Motor 17 to be deenergized and Spacing Conveyor 12 to stop. Accordingly, box 2 will be stopped as indicated by the notation "stop" in FIG. 3A.

The output from Sensor Circuit 21 will also be coupled through lead 26 and Gate 28 to Flip-Flop 29 to cause Flip-Flop 29 to have a low output at terminal FF1, and a high output on terminal FF2.

At this time, the And circuit 49 is receiving a high input on lead 47, a high input on lead 60, but a low input on lead 56. Accordingly, And circuit 49 will remain in its OFF state and Approach Output Circuit 41 will continue to provide a signal through the Static Motor Controller 20 to energize Motor 18 and drive Approach Conveyor 13 to continue to advance box 1.

Two and a half seconds later (at the 3.0 second mark in FIG. 3A) when Counter T1 reaches the count of 50, a low signal will be coupled from Counter T1 through Buffer 55 and lead 58 to turn And circuit 25 OFF, thus permitting Motor 17 to be energized to again start Spacing Conveyor 12 moving. (Note that Counter T1 assures that the spacing from the back of box 1 to front of box 2 is two-and-a-half feet.) Also, at this point, Counter T1 provides a signal through lead 59 and Reset circuit 61 to start Counter T2 counting. Buffer 55 will also provide a feedback signal through lead 54 to Gate 46 to hold Counter T1 at the Count of 50. Counter T2 will now continue to count until such time as the box 2 goes past the P1 datum line, at which time P1 will go from a dark to a light condition and the Sensor Circuit 21 output will change from "high" to "low."

At this point (at the 3.5 second mark in FIG. 3A), Counter T1 will now be reset to zero by the Sensor Circuit 21 and Reset circuit 31; and Counter T1 starts counting toward 50. Also, the signal from Sensor Circuit 21 will be coupled through lead 26 and gate 28 to Flip-Flop 29. Flip-Flop 29 will change its conducting condition to provide a high signal from its terminal FF1 through lead 46 and Gate 62 to Counter T2 and Counter T2 will be caused to hold or retain the count it has reached (count 10 in this instance). Whenever Counter T2 is in a counting or in a count hold condition, a high signal will be provided through Buffer 53 and lead 56 to And circuit 49.

Counter T1 will continue counting until Approach Conveyor 13 advances box 1 past the Photoconductor P2 datum line and box 1 is moved onto the Weight Conveyor 15. At this time (the 5.0 second mark in FIG. 3A), P2 goes from a dark to a light condition and causes the Box-In circuit 22 to provide a signal to Gate 28 to cause Flip-Flop 29 to change conducting states. Flip-Flop 29 will now provide a high signal at its terminal FF2 through lead 47 to And circuit 49. At this point a high signal is present on lead 47 and lead 56 as well as on lead 60, all of the three inputs to And circuit 49. Accordingly, And circuit 49 will now be ON and couple a signal through Approach Output Circuit 41 to cause Motor Controller 20 to deenergize motor 18 and stop Approach Conveyor 13. Box 2 which is on the Approach Conveyor will be stopped, as indicated by the notation stop in FIG. 3A.

At this point box 1 is on the Weight Conveyor 15 and is being moved at the rate of 60 feet per minute. The actual weighing operation of all the boxes which is not per se a part of this invention is performed while the box is in motion at the position labeled WT, see FIG. 3A.

The signal from Photoconductor P2 and Box-in circuit 22 through Flip-Flop 29 causes Counter T2 to now start counting from its memory or hold count (count 10 in this series of events) toward the count of 40. When Counter T2 reaches the count of 40, (at the 6.5 second mark in FIG. 3A) the signal on lead 56 will go low and And circuit 49 will go OFF thus interrupting the signal to output circuit 41, and Approach Motor Controller 20 will now energize Motor 18 to start the Approach Conveyor 13 moving. Also the Box-In circuit 22 signal (at the 5.0 second mark) causes Flip-Flop 29 to shift its conducting condition, and apply a signal from its terminal FF1 through leads 46 and 48 and Reset circuit 31 to reset Counter T1 to start counting from zero to assure the proper 2.5 feet spacing from the back of box 2 to the front of the succeeding box (i.e. box 3).

Note that boxes 1 and 2 will now be spaced to have a back-to-back spacing of four-and-a-half feet.

As mentioned, the weight of box 1 is taken at the point where the back end of the box is approximately one-half foot from the left end of the Weight Conveyor 15 and in the position indicated by the notation WT. Since in the embodiment shown Weight Conveyor 15 is four and one-half feet in length, the Spacing Control 10 will thus assure that box 1 is off of the Weight Conveyor 15 before the weight of box 2 is taken.

When Counter T1 reaches the count of 50, Counter T2 will be reset to zero to start counting (at the 7.5 second mark in FIG. 3A). T2 will continue to count until it reaches the count 40. Box 3, which is a relatively long box (two feet long), is now advanced from the Spacing Conveyor 12 to the Approach Conveyor 13. When box 3 passes the Photoconductor P1 datum line and P1 goes from a dark to a light condition, Counter T1 will be reset and start counting (see the 9.5 second time mark) and continue to count to 50. Since box 3 is two feet in length, the spacing between boxes 2 and 3 can be relatively closer together since the weight measurement of box 3 will not be taken until the back end of box 3 is one-half foot from the left-hand end of Weight Conveyor 15 in the position labeled WT; and, by the time box 3 reaches the WT position, box 2 will have moved off of the Weight Conveyor.

Next box 4 is advanced from the Spacing Conveyor 12 to the Approach Conveyor 13. In the same manner, as discussed above with respect to the spacing or abutting boxes 1 and 2, as soon as box 4 reaches the P1 datum line, the Spacing Conveyor 12 is caused to stop.

When Counter T1 reaches the count of 50 (at the 12 second mark in FIG. 3A) Spacing Conveyor 12 will start moving and advance box 4 onto Conveyor 13. Also Counter T2 will start to count and will continue to count until box No. 4 moves past the P1 datum line, at which time Counter T2 will go to a count holding condition, as described above and Counter T1 will be reset and start to count. As described above, the signal from Sensor Circuit 21 will cause Flip-Flop 29 to provide a signal to cause Counter T2 to go to its count hold condition. Counter T1 will continue to count until box 3 moves past the Photoconductor P2 datum line. At this point (at the 14 second mark in FIG. 3B) Photoconductor P2 goes to a light condition, and since Counter T2 has not previously reached the count of 40, the Approach Conveyor 13 is caused to stop. Counter T2 now starts counting from its hold position. Also, Counter T1 will be reset to zero and start to count toward 50.

When Counter T2 reaches the count of 40, the signal on lead 56 will go low, and And circuit 49 will go OFF, permitting Motor 18 to move Approach Conveyor 13. Counter T1 will count to 50 and reset Counter T2 to start to count to 40 (at the 16.5 second mark in FIG. 3B). After Conuter T2 counts to 40 and if there is no dark to light change in Photoconductor P1, the counters stop counting and the conveyors keep moving.

When box 5, which is a long box, four feet in length, moves past the P1 datum point (see the 20.5 second mark), the counting and operating sequence commences again. The Counter T1 will continue counting toward 50 and when Counter T1 reaches the count of 50, Counter T2 will be caused to start counting until such time as box No. 6 is advanced to the Photoconductor P1 datum line. The operating sequence will then repeat in a manner as explained above.

Note, that the spacing between the relatively short boxes 1 and 2, as these boxes are advanced through the Weight Conveyor is 4.5 feet while the spacing between box 2 and the relatively long box 3 is 2.5 feet. As mentioned, the feature of spacing the boxes in accordance with their respective length as provided by the invention assures that only one box is on the Weight Conveyor at the time the weight is taken while yet assuring that the boxes are a proper minimum distance apart for maximum efficiency and adequate processing of the boxes.

The information obtained as to the measurements of the individual boxes is printed out at the time period labeled "Print Out" in FIG. 3B, and the boxes are then conveyed to the desired loading or storage area.

The system and method of the invention thus assures that no more spacing is provided between the boxes than is absolutely necessary while yet assuring that a minimum required spacing is provided to process a maximum number of boxes (articles) during a given period of time. Note also that if the boxes being advanced by the conveyor are already a sufficient distance apart the system of the invention will not interrupt the movement of the boxes.

While the invention has been particularly shown and described with reference to a preferred embodiment thereof, it will be understood by those skilled in the art that changes in form and details may be made therein without departing from the spirit and scope of the invention.

We claim:
1. An article spacing system for controlling the spacing of articles of different length being advanced in succession along a path comprising,
   first and second means for advancing said articles at selected speeds;
   first and second detecting means responsive to the presence and passage of articles at respective first and second points along said path;
   first and second timing means cooperatively responsive to said first and second detecting means;
   means for selectively controlling the movement of said first and second advancing means to selectively space successive articles as a function of the length of the articles.
2. An article spacing system as in claim 1 wherein said advancing means comprises first and second conveyors, and said second conveyor moves at a higher speed than said first conveyor.
3. An article spacing system as in claim 1 wherein said detecting means comprises a lamp and photosensitive device.
4. An article spacing system as in claim 1 wherein,
   said second timing means has a timing condition and a time hold condition;
   means for controlling the movement of said first advancing means in response to said first timing means, said first timing means causing said first advancing means to stop when said first detecting means detects a succeeding article spaced closer to an article than a selected minimum;
   said second timing means being responsive to said first timing means and being caused to shift to its memory condition when said first detecting means responds to said succeeding article;
   means for shifting said second timing means to its timing condition when said second detecting means responds to an article moving past said second point to thereby stop said second advancing means, dependent on the timing period to which said second timing means is set;
   whereby the spacing between contiguous articles is a function of the length of the articles.
5. An article spacing system as in claim 4 wherein said timing means relate to the movement of said conveyors such that said first timing means establishes the spacing between the back of an article and the front of a succeeding article and said second timing means establishes the spacing between the back of an article and the back of a succeeding article.
6. An article spacing system for controlling the spacing of articles of different length being advanced in succession along a path comprising,
   first and second advancing means;
   first and second detecting means for detecting the presence and passage of an article positioned in relative spaced relation at respective first and second selected points along said path;
   first counting means responsive to said detecting means for initiating a counting operation toward a preset count each time an article moves past said first point;
   means for stopping the movement of said first advancing means when said first detecting means responds to a succeeding article before said first counting means reaches said preset count; and
   means for causing said first advancing means to move when said first counting means reaches said preset count.
7. An article spacing system as in claim 6 wherein said advancing means move at different speeds.
8. An article spacing system as in claim 6 wherein,
   said second counting means has a counting condition and a memory or count hold condition; and further including,
   means for causing said second counting means to initiate a count when said first counting means attains a first count;
   means for shifting said second counting means to its memory condition when said first detecting means detects the passage of an article;
   means for shifting said second counting means to its counting condition when said second detecting means detects the passage of an article; and means for causing said second advancing means to start moving when said second counting means attains a preset count, whereby said second article is spaced a selected distance from said first article, dependent on the respective length thereof.

9. A control system for controlling the motion of articles being advanced along a path by separate cooperating conveyor means, said system comprising, in combination:

first and second detecting means mounted in spaced relation for detecting the presence and passage of articles at respective spaced points along said path; and first and second timing means responsive to said first and second detecting;

said first timing means being actuated to a timing condition when said first detecting means detects the passage of first article;

said first timing means causing a first of said conveyors to stop for a preset time in accordance with a first criteria when said detecting means detects a second article prior to a preset time period;

said second timing means having a timing condition and also having a memory condition to which it is set when said first detecting means detects said second article prior to a preset time as determined by said first timing means;

said second timing means being actuated to change from its memory condition to a timing condition when said second detecting means detects the passage of said first article during which timing condition a second of said conveyors is stopped for a timed period in accordance with a second criteria to space said second article from said first article.

10. An article spacing system for controlling the spacing of articles of different length being advanced in succession along a conveyor path comprising, first conveyor means moving at a first speed;

second conveyor means moving at a second speed higher than said first speed;

first and second detecting means for responding to the presence of articles at respective first and second points along said path;

first and second counting means cooperatively responsive to said first and second detecting means;

means for controlling the movement of said first conveyor in response to the count entered into said first counting means;

said second counting means being responsive to the count in said first counting means and being caused to stop counting and hold its count when said first detecting means responds to a succeeding article;

said second counting means resuming and completing its count when said second detecting means responds to an article moving past said second point to thereby control the operation of said second conveyor dependent on the count to which said second counting means is set whereby the spacing between succeeding articles is a function of the length of the articles.

11. An article spacing system as in claim 10 wherein a first motor is controlled to drive said first conveyor means at a first speed and a second motor is controlled to drive said second conveyor means at a second speed.

12. A method for spacing articles of different length being advanced in succession along a path, comprising the steps of:

spacing adjacent articles in accordance with a first factor;

comparing the spacing between adjacent articles with a predetermined reference to determine the minimum permissible spacing therebetween; and spacing said articles in accordance with a second factor dependent on the results of said comparison.

13. A method for spacing articles of different length being advanced along a path as in claim 12 wherein, said first factor is the distance from the back of an article to the front of a succeeding article; and said second factor is the distance from the back of said article to the back of said succeeding article.

14. A method for spacing articles of different length being advanced in succession along a path, comprising the steps of:

providing separate motive means for advancing said articles;

controlling the relative movement of a first and a second motive means to obtain a predetermined spacing between the back of a first article and the back of a second article; and controlling the relative movement of said second motive means and a third motive means to space a third article to have a predetermined spacing between the back of said second article and the front of the third article, whereby a spacing is obtained between articles depending on the length thereof.

References Cited

UNITED STATES PATENTS 3,266,614  8/1966  Griner _____ 198—34

EDWARD A. SROKA, Primary Examiner

U.S. Cl. X.R.

250—223